(12) United States Patent
Tseng et al.

(10) Patent No.: US 12,528,141 B2
(45) Date of Patent: Jan. 20, 2026

(54) LASER WELDING METHOD OF PIPE FITTING

(71) Applicant: GENII IDEAS CO., LTD., Hsinchu (TW)

(72) Inventors: Kuo Chiang Tseng, Hsinchu (TW); Nan Kai Weng, Hsinchu (TW)

(73) Assignee: GENII IDEAS Co., Ltd., Hsinchu (TW)

( * ) Notice: Subject to any disclaimer, the term of this patent is extended or adjusted under 35 U.S.C. 154(b) by 975 days.

(21) Appl. No.: 17/655,855

(22) Filed: Mar. 22, 2022

(65) Prior Publication Data

US 2023/0234167 A1 Jul. 27, 2023

(30) Foreign Application Priority Data

Jan. 27, 2022 (TW) .................. 111103705

(51) Int. Cl.
*B23K 26/282* (2014.01)
*B23K 26/06* (2014.01)
*B23K 26/08* (2014.01)
*B23K 37/053* (2025.01)
*B23K 101/10* (2006.01)

(52) U.S. Cl.
CPC ........ *B23K 26/282* (2015.10); *B23K 26/0643* (2013.01); *B23K 26/0869* (2013.01); *B23K 37/053* (2013.01); *B23K 2101/10* (2018.08)

(58) Field of Classification Search
CPC .............. B23K 26/282; B23K 26/0643; B23K 26/0869; B23K 26/103; B23K 37/053; B23K 2101/10
See application file for complete search history.

(56) References Cited

U.S. PATENT DOCUMENTS 4,001,543 A * 1/1977 Bove .................... B23K 37/053
219/121.74

* cited by examiner

*Primary Examiner* — Edward F Landrum
*Assistant Examiner* — Kuangyue Chen
(74) *Attorney, Agent, or Firm* — Rosenberg, Klein & Lee (57) ABSTRACT

The present invention relates to a laser welding method of pipe fittings that mainly provides an automated butt welding process for two pipe fittings to be welded, comprising a laser welding device setup step, a material loading step, a first welding step, a second welding step, a third welding step, and a return to the original position step. The welding zone at the butt joint location of the two pipe fittings to be welded is divided to undergo three procedures through the aforementioned steps, using a laser assembly in conjunction with a reflection assembly, to provide a consistent automated butt welding for two pipe fittings to be welded.

7 Claims, 8 Drawing Sheets

LASER WELDING METHOD OF PIPE FITTING

BACKGROUND OF THE INVENTION

1. Fields of the Invention

The present invention relates to a laser welding, especially, a laser welding method of pipe fittings that can be automated and the device thereof.

2. Descriptions of Related Art

Generally, when two round pipe fittings are welded in the factory, due to the nature that round pipe fittings are not easy to process, the welding of pipe fittings of the prior art are performed by the personnel on site to weld around a circle along the continuous seam using a welding gun. However, welding operations that mainly rely on human workforce generate problems of uneven, non-uniform, porous weld beads, leading to embrittlement of the weldment. Therefore, there is a realistic need for improvement.

SUMMARY OF THE INVENTION

In view of the aforementioned problems, the inventor of the present invention has developed a laser welding method of pipe fittings. The main objective of the present invention is to provide a laser welding method of pipe fittings that increases the efficiency of butt welding; the secondary objective of the present invention is to provide a laser welding method of pipe fittings that enhance the production quality; one further objective of the present invention is to provide a round pipe welding suitable for different diameters.

To achieve the aforementioned objectives, the following technical means are implemented.

A laser welding method of pipe fittings comprises a laser welding device setup step to set up a laser assembly and a reflection assembly, wherein the laser assembly has a first rotating axis and the reflection assembly has a second rotating axis; a material loading step to load the filler material on two pipe fittings to be welded, to place and fix the butt joint location of the two pipe fittings to be welded under the laser assembly, and to install the reflection assembly around the butt joint location of the two pipe fittings to be welded; a first welding step, having the laser assembly to project a laser beam at the butt joint location of the two pipe fittings to be welded and the laser assembly to perform welding while moving around the second rotating axis of rotation; a second welding step, having the laser assembly then to undergo a swinging motion with a first angle with respect to the first rotating axis so that the laser beam projects to the reflection assembly and is reflected to the butt joint location of the other angle of the two pipe fittings to be welded, while at the same time the laser assembly, the first rotating axis, and the reflection assembly are linked to the movement around the second rotating axis of rotation synchronously for welding; a third welding step, having the laser assembly then to undergo a swinging motion with a second angle with respect to the first rotating axis so that the laser beam projects to the reflection assembly and is reflected to the butt joint location of another angle of the two pipe fittings to be welded, while at the same time the laser assembly, the first rotating axis, and the reflection assembly are linked to the movement around the second rotating axis of rotation synchronously for welding; and a return to the original position step, having the laser assembly then to undergo a swinging motion with a third angle with respect to the second rotating axis so that the laser assembly is restored to the original position.

The third angle of the aforementioned laser assembly is set to 45~60 degrees.

The vector coordinate of the second rotating axis of the aforementioned return to the original position step is set to [x3,y3].

The vector coordinate of the aforementioned first rotating axis is set to [x,y]; the vector coordinate of the second rotating axis of the second welding step is set to [x1,y1]; the vector coordinate of the second rotating axis of the third welding step is set to [x2,y2].

The first angle of the aforementioned laser assembly is set to 45~60 degrees; the second angle of the aforementioned laser assembly is set to 60~70 degrees.

The maximum swing angle of the aforementioned laser assembly is set to 120~160 degrees.

The aforementioned reflection assembly further comprises a first lens set and a second lens set, wherein the first lens set is used in the second welding step to reflect the laser beams and the second lens set is used in the third welding step to reflect the laser beams.

The first lens set and the second lens set described above have an angular position relationship, wherein the angular position relationship is set to 120~150 degrees.

The welding zone at the butt joint location of the two pipe fittings to be welded is divided to undergo three procedures through the aforementioned steps to provide a consistent automated butt welding for two pipe fittings to be welded, in order to reduce the time consumed during the butt welding of pipe fittings and increase the speed of the production process.

The present invention can achieve the following effectiveness by implementing the aforementioned technical means:

1. The present invention divides the weld run of the welding zone at the butt joint location of the two pipe fittings to be welded to undergo three procedures through the aforementioned steps in order to reduce the time consumed during the butt welding and increase the speed of the production process.

2. The present invention provides an automated welding process to control a suitable welding time period and speed according to the material and size of a weldment, which is fully computerized, in order to enhance the quality of the finished product after the weld is completed.

3. The present invention is to place and fix the butt joint location of the two pipe fittings to be welded under the laser assembly and, therefore, is applicable to welding operations of different diameters of pipe fittings to be welded.

DETAILED DESCRIPTION OF THE PREFERRED EMBODIMENT

Figure 1:
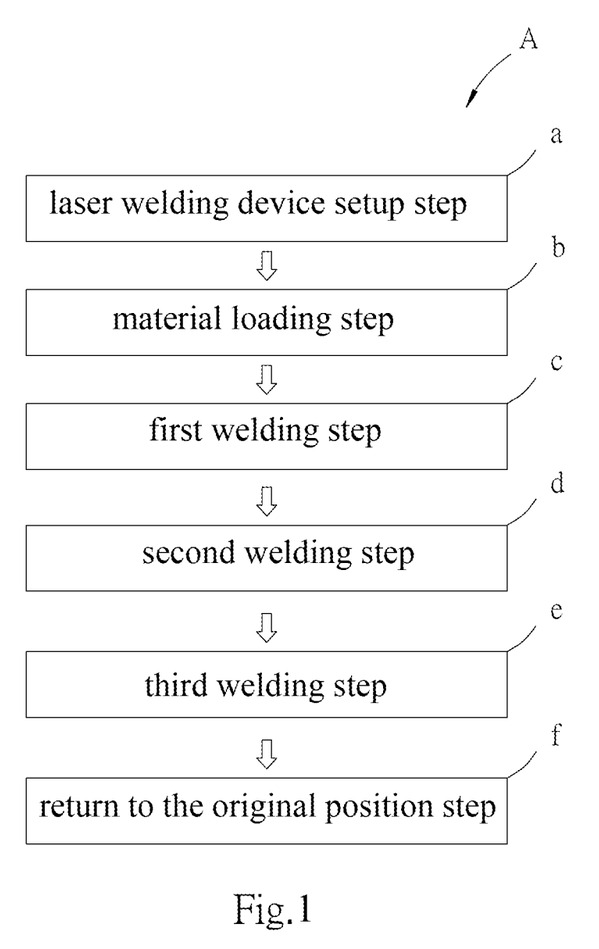
FIG. 1 is a flow chart of the laser welding method of pipe fittings of the present invention.

Please refer to FIG. 1. The laser welding method of pipe fittings A of the present invention comprises: a laser welding device setup step a, a material loading step b, a first welding step c, a second welding step d, a third welding step e, and a return to the original position step f. Detailed descriptions of the aforementioned components along with figures and embodiments are given herein below for illustration only, and thus do not limit the present invention.

Figure 2:
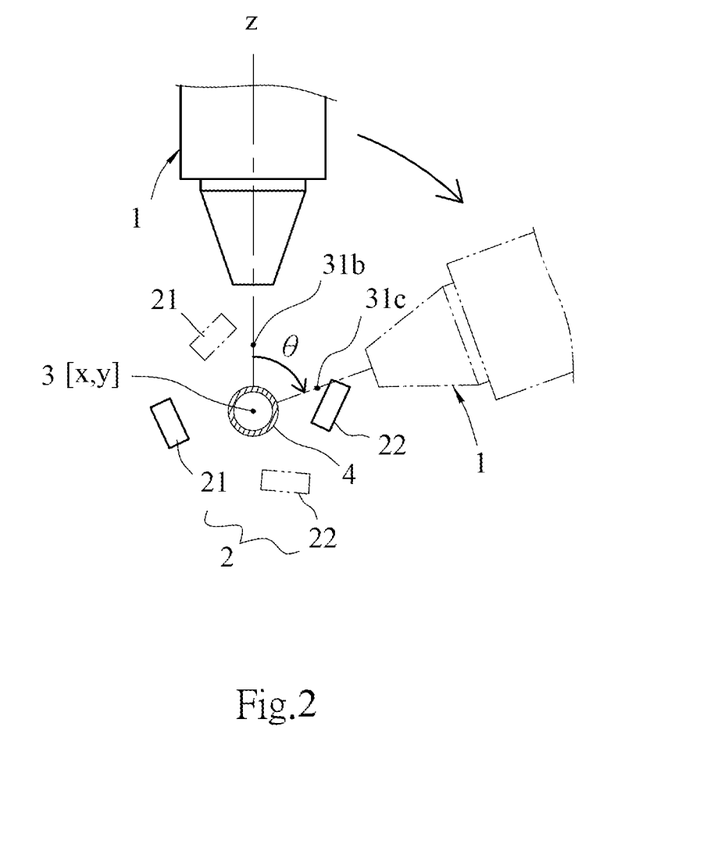
FIG. 2 is an initial schematic diagram of the laser welding method of pipe fittings of the present invention.
Figure 3:
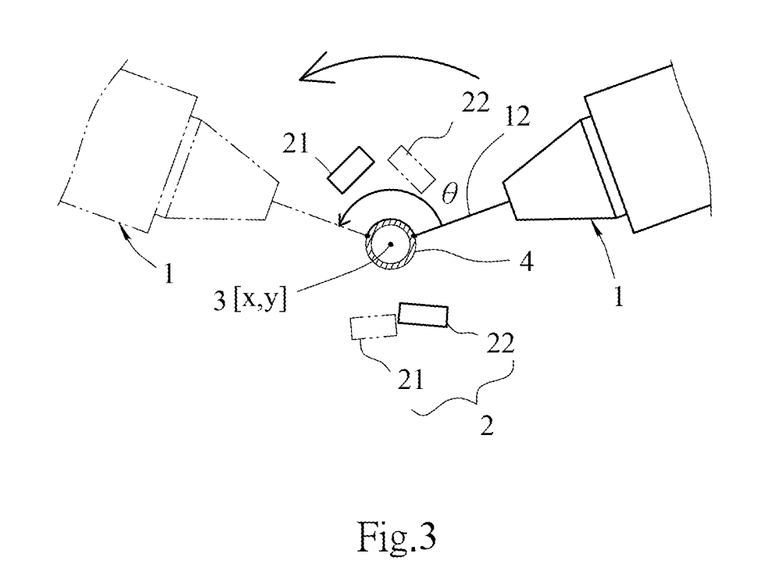
FIG. 3 is a schematic diagram of the weld path of the first welding step of the present invention.

The aforementioned laser welding device setup step a, as shown in FIG. 2 and FIG. 3, sets up a laser assembly 1 and a reflection assembly 2, wherein the laser assembly 1 has a first rotating axis 31 and a swing angle θ; the reflection assembly 2 has a second rotating axis 3 along the centerline thereof with a vector coordinate of [x,y]; the reflection assembly 2 has a first lens set 21 and a second lens set 22; the first lens set 21 and the second lens set 22 have an angular position relationship, wherein the angular position relationship is set to 120~150 degrees.

In addition, the maximum swing angle θ of the aforementioned laser assembly 1 is set to 120~160 degrees and symmetric to the vertical axis z. The swing angle θ of the preferred embodiment of the present invention is set to 140 degrees, wherein the laser assembly 1 is symmetric to the vertical axis z and inclined at 70 degrees on both sides.

The aforementioned material loading step b, as shown in FIG. 2, loads the filler material on two pipe fittings to be welded 4, places and fixes the butt joint location under the laser assembly 1, and installs the first lens set 21 and the second lens set 22 of the reflection assembly 2 around the butt joint location of the two pipe fittings to be welded 4. The laser assembly 1 moves around the second rotating axis 3 of rotation in a clockwise direction having the swing angle θ set to 70 degrees readily for the welding process.

The aforementioned first welding step c, as shown in FIG. 3, activates the laser assembly 1 to project a laser beam 12 at the butt joint location of the two pipe fittings to be welded 4 directly; the laser assembly 1 performs the first partial butt welding operation while moving around the second rotating axis 3 of rotation in a counterclockwise direction having the swing angle set to 140 degrees; the reflection assembly 2 moves around the second rotating axis 3 of rotation in a counterclockwise direction having the swing angle set to 140 degrees synchronously.

Figure 4:
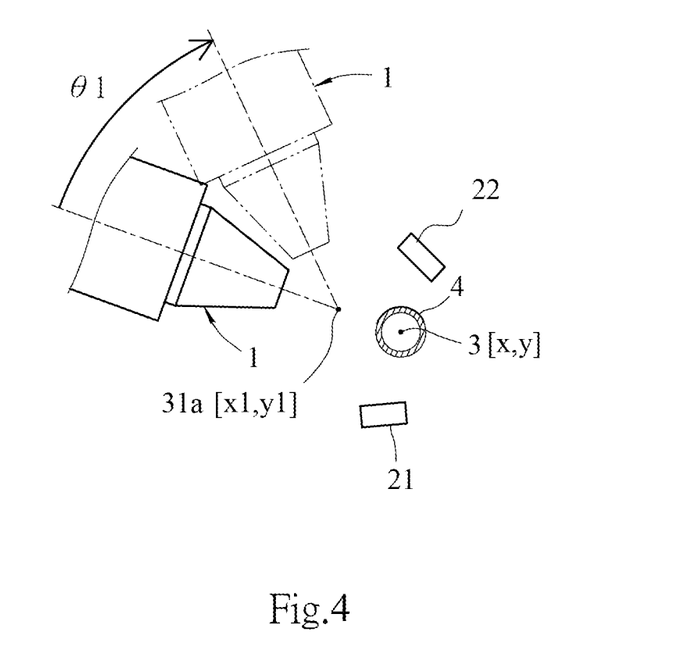
FIG. 4 is a schematic diagram of the first angle of the swinging motion of the second welding step of the present invention.
Figure 5:
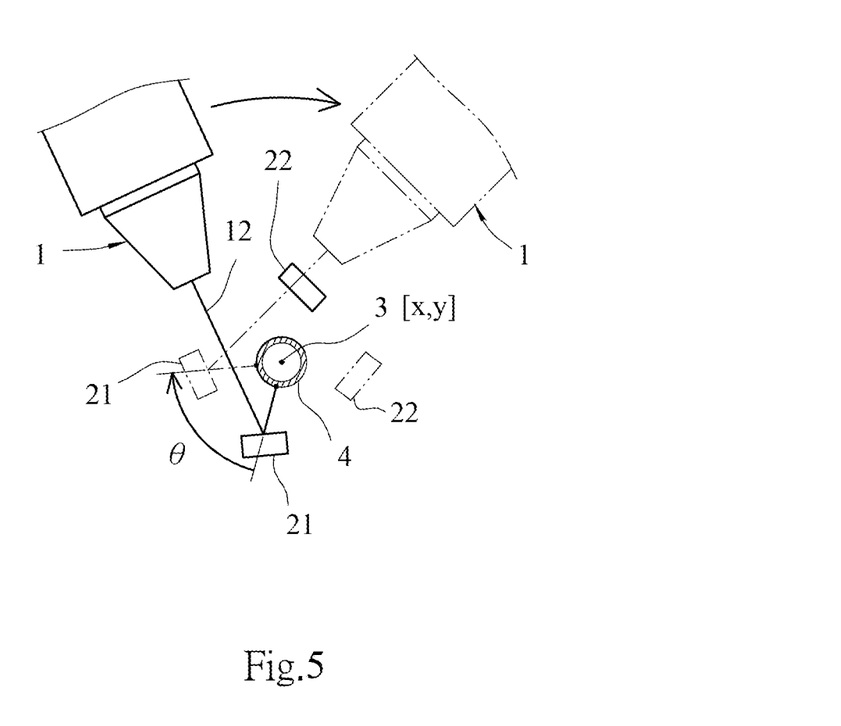
FIG. 5 is a schematic diagram of the weld path of the second welding step of the present invention.

The aforementioned second welding step d, as shown in FIG. 4 and FIG. 5, turns off the laser assembly 1; the laser assembly 1 then undergoes a swinging motion with a first angle θ 1 with respect to the first rotating axis 31a in a clockwise direction so that the laser beam 12 can aim precisely at the first lens set 21 and avoid the two pipe fittings to be welded 4. In addition, the vector coordinate of the first rotating axis 31a is set to [x1,y1], wherein the first angle θ 1 is set to 45~60 degrees whereas the swing angle of the preferred embodiment is 45 degrees; the first lens set 21 and the second lens set 22 remain still at the same time. Next, the laser beam 12 is activated and emitted to the first lens set 21, and is reflected to the butt joint location of the other angle of the two pipe fittings to be welded 4, while at the same time the laser assembly 1, the first rotating axis 31a, and the reflection assembly 2 are linked to the movement around the second rotating axis 3 of rotation in a clockwise direction, having the swing angle θ set to 60~70 degrees synchronously for performing the second partial welding operation, wherein the swing angle of the preferred embodiment is 70 degrees. At this moment, the first rotating axis moves from the location of 31a to 31b.

Figure 6:
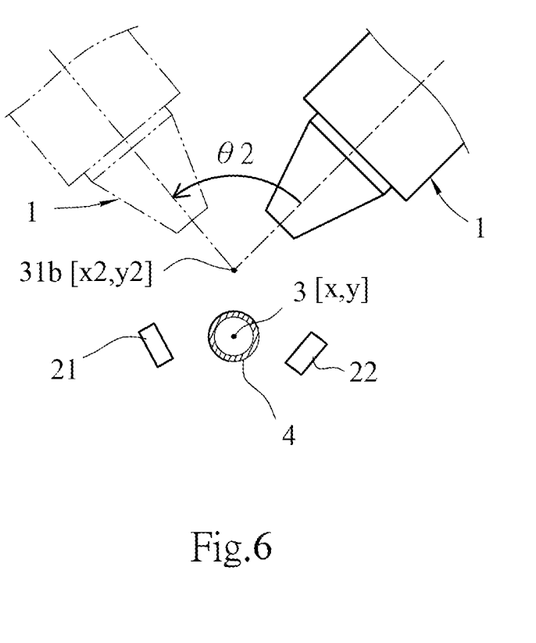
FIG. 6 is a schematic diagram of the second angle of the swinging motion of the third welding step of the present invention.

The aforementioned third welding step e, as shown in FIG. 6 and FIG. 7, again turns off the laser assembly 1; the laser assembly 1 then undergoes a swinging motion with a second angle θ 2 with respect to the first rotating axis 31b in a counterclockwise direction so that the laser beam 12 can aim precisely at the second lens set 22 and avoid the two pipe fittings to be welded 4. In addition, the vector coordinate of the first rotating axis 31b is set to [x2,y2], wherein the second angle θ 2 is set to 60~70 degrees whereas the swing angle of the preferred embodiment is 70 degrees; the first lens set 21 and the second lens set 22 remain still at the same time. Next, the laser beam 12 is activated and emitted to the second lens set 22, and is reflected to the butt joint location of another angle of the two pipe fittings to be welded 4, while at the same time the laser assembly 1, the first rotating axis 31b, and the reflection assembly 2 are linked to the movement around the second rotating axis 3 of rotation in a clockwise direction, having the swing angle θ set to 60~70 degrees synchronously to perform the third partial welding operation, wherein the swing angle of the preferred embodiment is 70 degrees. At this moment, the first rotating axis moves from the location of 31b to 31c.

Figure 8:
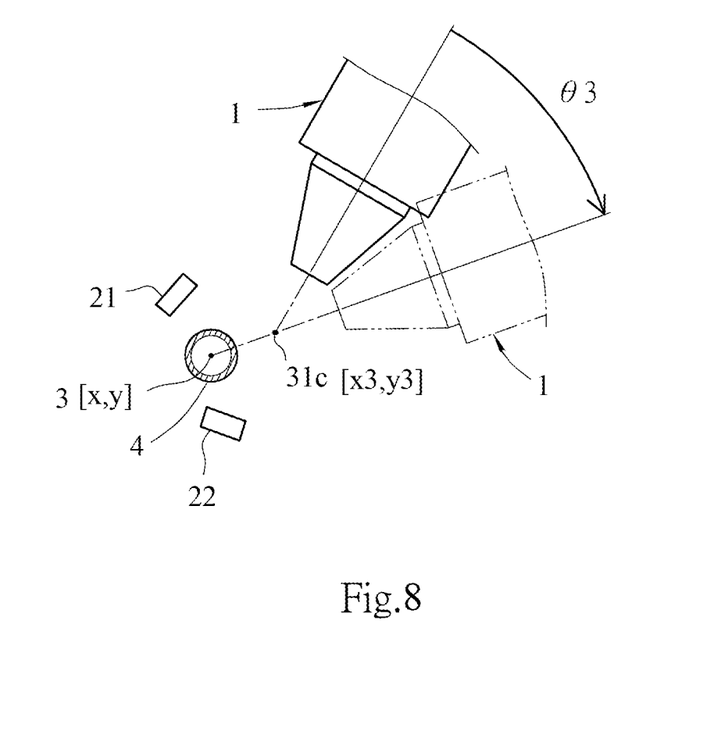
FIG. 8 is a schematic diagram of the return to the original position step of the laser welding method of pipe fittings of the present invention.

The aforementioned return to the original position step f, as shown in FIG. 8, has the laser assembly 1 to undergo a swinging motion with a third angle θ 3 with respect to the first rotating axis 31c in a clockwise direction; at this time, the vector coordinate of the first rotating axis 31c is set to [x3,y3], wherein the third angle θ 3 is set to 45~60 degrees whereas the swing angle of the preferred embodiment is 45 degrees. Thus, the laser assembly 1 returns to align with the central axis of the second rotating axis 3 so that the laser assembly 1 is restored to the original position.

The aforementioned operation mode of the laser assembly 1 and the operation mode of the reflection assembly 2 are summarized as follows in Table 1:

TABLE 1

|  | Operation of the laser assembly | Operation of the reflection assembly |
|---|---|---|
| The material loading step | A swinging motion with respect to the second rotating axis | A swinging motion with respect to the second rotating axis |
| The first weldingstep | A swinging motion with respect to the second rotating axis | A swinging motion with respect to the second rotating axis |
| The second welding step | A swinging motion with respect to the first rotating axis 31a, the second rotating axis | A swinging motion with respect to the second rotating axis |
| The third welding step | A swinging motion with respect to the first rotating axis 31b, the second rotating axis | A swinging motion with respect to the second rotating axis |
| The return to the original position step | A swinging motion with respect to the first rotating axis 31c | No swinging motion |

Therefore, the present invention provides an improved method of the laser welding method of pipe fittings A, as illustrated in FIG. 1 to FIG. 3 and Table 1. The main improvement of the method is to place and fix the butt joint location of the two pipe fittings to be welded 4 under the laser assembly 1, so that the laser beam 12 of the laser assembly 1 is emitted at the butt joint location of the two pipe fittings to be welded 4 to perform the first partial butt welding operation.

As shown in FIG. 4 and FIG. 5, the laser assembly 1 then undergoes a swinging motion with a first angle θ 1 with respect to the first rotating axis 31a so that the laser beam 12 is emitted at the first lens set 21 and is reflected to the other butt joint location of the two pipe fittings to be welded 4, while at the same time the laser assembly 1, the first rotating axis 31a, and the reflection assembly 2 rotate around the second rotating axis 3 of rotation synchronously, and perform the second partial butt welding operation on the butt joint location of the other angle of the two pipe fittings to be welded 4, wherein the first rotating axis 31a moves to the location of the first rotating axis 31b.

Figure 7:
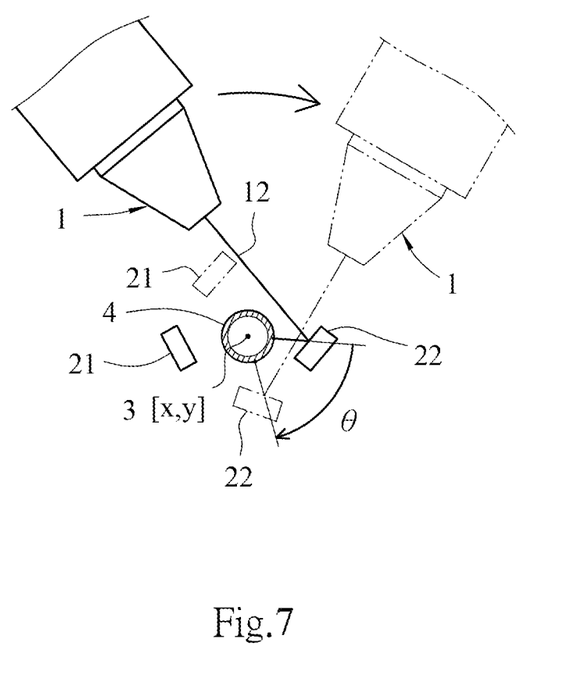
FIG. 7 is a schematic diagram of the weld path of the third welding step of the present invention.

Subsequently, as shown in FIG. 6, FIG. 7 and Table 1, the laser assembly 1 then undergoes a swinging motion with a second angle θ 2 with respect to the first rotating axis 31b so that the laser beam 12 is emitted at the second lens set 22 and is reflected to another butt joint location of the two pipe fittings to be welded 4, while at the same time the laser assembly 1, the first rotating axis 31b, and the reflection assembly 2 rotate around the second rotating axis 3 of rotation synchronously, wherein the first rotating axis 31b moves to the location of the first rotating axis 31c, and perform the third partial butt welding operation on the butt joint location of another angle of the two pipe fittings to be welded 4. Thus, a butt weld run has been completed.

Last, please refer to FIG. 8 and Table 1. The laser assembly 1 then undergoes a swinging motion with a third angle θ 3 with respect to the first rotating axis 31c so that the laser assembly 1 is restored to the original position that is beneficial to the next run of welding operation.

By the use of process steps of the aforementioned laser welding method of pipe fittings of the present invention, a consistent automated welding for the butt joint location of pipe fittings is provided to replace the previously labor intensive and time consuming operations, thus to increase the speed of the production process of the pipe fitting welding and to enhance the quality of the finished product after the butt welding process is completed. The method is applicable to welding operations of different diameters of pipe fittings to be welded 4 and improve the quality of butt welding operations by accurately control the welding position.

In summary, the present invention relates to a "laser welding method of pipe fittings" and such method has not been published, patented, nor available for public use. Therefore, the present invention meets the key requirements for patentability and, therefore, hereby the application is submitted.

For Patent Officers to better understand the aforementioned contents, novel features, technology principles, advantages of the present invention and the effect thereof that can be achieved, detail descriptions of the present invention are provided accompanied by diagrams and preferred embodiments. Alternative embodiments will become apparent to those skilled in the art to which the present invention pertains without departing from its spirit and scope.

What is claimed is:

1. A laser welding method of pipe fittings, comprising:
   establishing a laser assembly and a reflection assembly, wherein the laser assembly has a first rotating axis and the reflection assembly has a second rotating axis;
   loading a filler material on two pipe fittings to be welded;
   fixing a butt joint location of the two pipe fittings to be welded under the laser assembly;
   installing the reflection assembly around the butt joint location of the two pipe fittings;
   projecting a laser beam, by the laser assembly, at a first portion of a circumference of the butt joint location of the two pipe fittings to perform welding therealong while moving the laser assembly and the reflection assembly around the second rotating axis of rotation synchronously;
   moving the laser assembly by a first angle around the first rotating axis while maintaining a position of the reflection assembly;
   projecting the laser beam, by the laser assembly, at the reflection assembly to thereby reflect the laser beam to a second portion of the circumference of the butt joint location of the two pipe fittings to perform welding therealong while moving the laser assembly, the first rotating axis, and the reflection assembly around the second rotating axis of rotation synchronously;
   moving the laser assembly by a second angle around the first rotating axis while maintaining the position of the reflection assembly;
   projecting the laser beam, by the laser assembly, at the reflection assembly to thereby reflect the laser beam to a third portion of the circumference of the butt joint location of the two pipe fittings to perform welding therealong while moving the laser assembly, the first rotating axis, and the reflection assembly around the second rotating axis of rotation synchronously, and
   moving the laser assembly by a third angle around the first rotating axis while maintaining the position of the reflection assembly.

2. The laser welding method of pipe fittings as claimed in claim 1, wherein the third angle of the laser assembly is set to 45~60 degrees.

3. The laser welding method of pipe fittings as claimed in claim 1, wherein each position of the first rotating axis is different from the position of the second rotating axis.

4. The laser welding method of pipe fittings as claimed in claim 1,
   wherein the first angle of the laser assembly is set to 45~60 degrees, and
   wherein the second angle of the laser assembly is set to 60~70 degrees.

5. The laser welding method of pipe fittings as claimed in claim 1, wherein a maximum swing angle of the laser assembly is set to 120~160 degrees.

6. The laser welding method of pipe fittings as claimed in claim 1,
   wherein the reflection assembly comprises a first lens set and a second lens set, and
   wherein the first lens set reflects the laser beam to the second portion of the circumference of the butt joint location and the second lens set reflects the laser beam to the third portion of the circumference of the butt joint location.

7. The laser welding method of pipe fittings as claimed in claim 6, wherein the first lens set and the second lens set have an angular position relationship set to 120~150 degrees.

* * * * *